Patented Dec. 23, 1924.

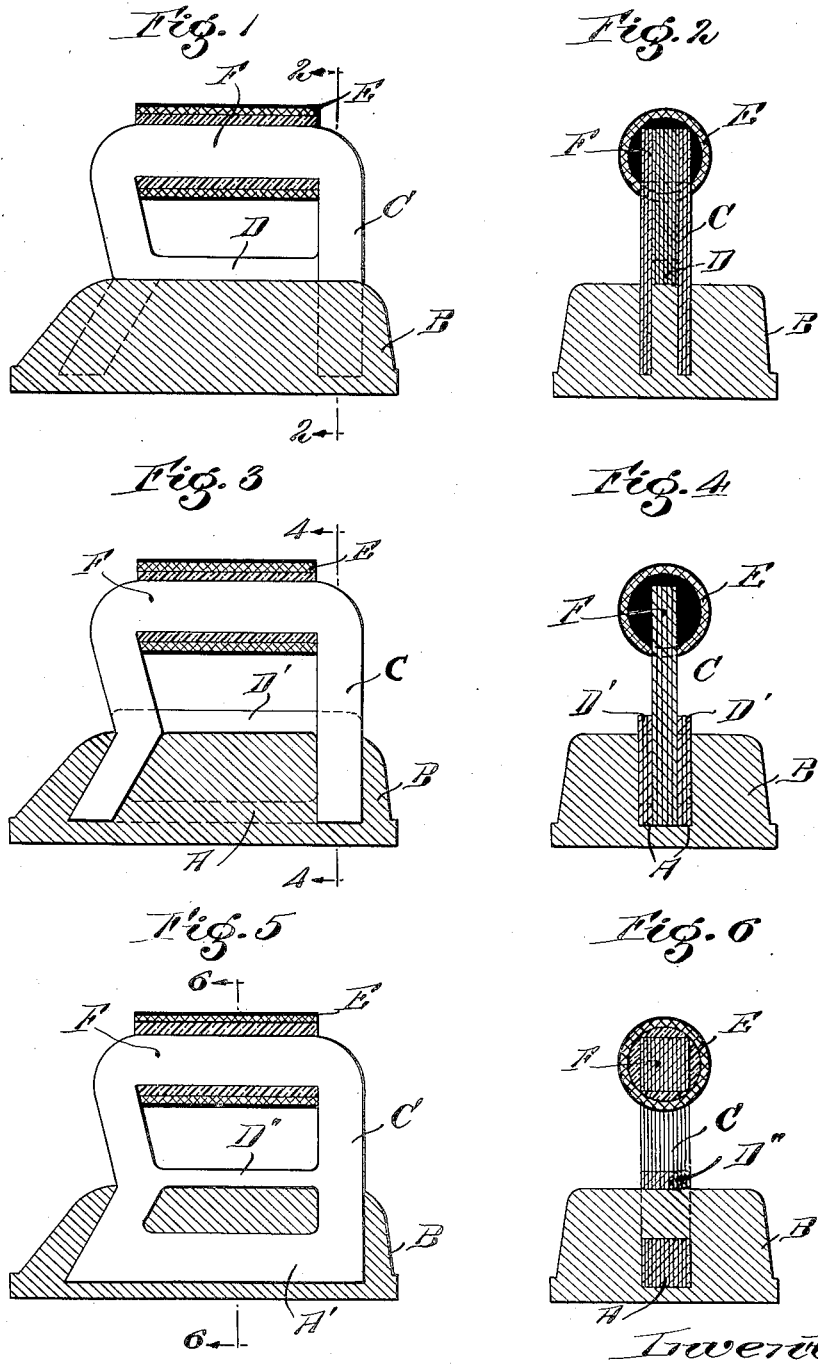

1,520,174

UNITED STATES PATENT OFFICE.

NELSON O. CLARK, OF TEXARKANA, ARKANSAS.

ELECTRIC HEATING DEVICE.

Application filed May 16, 1923. Serial No. 639,322.

*To all whom it may concern:*

Be it known that I, NELSON O. CLARK, a citizen of the United States of America, and resident of Texarkana, in the county of Miller and State of Arkansas, have invented new and useful Improvements in Electric Heating Devices, of which the following is a specification.

This invention relates to electric heating devices of the induction type wherein heat is generated by secondary current induced from an alternating current exciter, and particularly to electric flat irons of the induction type.

Objects of the invention are to simplify the construction of such devices, particularly the body portion thereof, to protect the exciting coil from the heat produced by the energy derived therefrom, to limit the current in the exciter in accordance with the maximum heat desired without dissipating a part of the energy with resistance in the exciter circuit, and generally to improve devices of this character.

The novel characteristics of the invention are set forth in the appended claims and illustrated by concrete embodiments in the accompanying drawings, in which:—

Figs. 1, 3 and 5 are central longitudinal sections of three different applications of the invention to flat irons; and Figs. 2, 4 and 6 are sections on lines 2—2, 4—4 and 6—6 of Figs. 1, 3 and 5 respectively.

The particular embodiments chosen for the purpose of illustration comprise flat irons having body portions B formed of steel or other paramagnetic material and core structures C, preferably formed of laminated steel, and an exciting coil E wound on a portion of the core structure exterior of the body B.

The core structures are characterized by U-shaped portions looping outwardly from the body B and having their ends embedded in the body, the exciter being mounted on the portion extending outside of the body, preferably on the bridge of the U-shaped structure. The ends of the U-shaped structure which are embedded in the body B may or may not be connected together with integral cross laminations. Thus in Figs. 1 and 2 the ends of the U-shaped structures are not interconnected within the body, while in Figs. 3 and 6 the ends are integrally interconnected by bridges A and A'. The sides of the U-shaped structure are also interconnected by bridges D, D' and D'' intermediate the body and the bridge F carrying the exciter coil.

In Figs. 1 and 2, the bridge D is integral with the central group of laminations of the core structure while the outer laminations extend into the body B. In Figs. 3 and 4 the bridge D' is integral with the outer laminations which also comprise the bridge A, the central laminations having the sides unconnected except through the exciter coil E. In Figs. 5 and 6 all of the laminations have cross portions constituting the bridges F, D'' and A'.

In each modification the portion of the core structure extending into the body B is preferably embedded in the body in the process of casting the body.

When alternating current flows through the exciting coil E, magnetic flux is caused to flow between the side portions of the core structure within the body B, the flux flowing predominantly through the laminations if the side portions are interconnected within the body and flowing through the body B if the side portions are unconnected within the body. This flux produces eddy currents in the body B which heat the body.

In the ordinary heating device, the heating effect produced by current of the usual commercial voltages would be excessive unless restricted in some way. The usual way to restrict the heating effect is to employ relatively high resistance either in the winding of the exciter coil or in the form of a rheostat. This not only involves additional cost in construction but it also involves a considerable waste in the form of heat dissipated; and where the exciter itself has a high resistance the heat produced therein is objectionable. According to the present invention, the exciting current is restricted to a safe value by means of magnetic shunts such as the bridges D, D' and D''. The theory of operation of these shunt bridges I believe to be as follows:

If no eddy currents were generated in the body B, the flux produced by the exciter E would in itself adequately limit the current in the exciter. However, the eddy currents in the body B produce a counter flux which tends to neutralize the flux produced by the exciter and the current of the exciter increases in proportion to this neutralization. The shunts D, D'' and D' serve to restrict this neutralization to such extent that the exciter current will never rise above the value corresponding to the maximum heat desired.

With the shunt bridge formed integrally with the exciter bridge as shown in Figs. 1 and 2, the effect of the bridge is chiefly to shunt a part of the exciter flux from the body B. The shunt bridge D is therefore so proportioned as to shunt enough flux to restrict the exciter current as aforesaid without shunting enough flux to prevent the body from being heated to the desired temperature. Where the shunt bridge is formed integrally with the bridge within the body as in Figs. 3 and 4, the bridge D' acts chiefly to shunt the counter flux produced by the eddy currents from the exciter coil whereby the exciter flux in the bridge F limits the exciting current. In Figs. 5 and 6 where the bridge D" is integral with both the bridges F and A', it serves to shunt a part of the exciter flux and also a part of the counter flux so that its action is similar to that of both the shunts D and D'.

An essential characteristic of the magnetic shunts D, D' and D" is that they be outside the body B and free from conducting material on at least one side so that the flux flowing therethrough can not generate current therearound which would set up a neutralizing flux as in the case of the flux flowing through the body B. In the particular embodiment shown in the drawings, the shunt bridges D, D' and D" are free from conducting material on three sides, namely the top and two lateral sides, but it will be evident that these bridges may be partially surrounded with conducting material without producing induced currents therearound.

From the foregoing it will be evident that the main paramagnetic path is substantially closed whether it comprises continuous laminations as in Figs. 5 and 6 or is in part completed by the body of the device as in Figs. 1 to 4; also that the part of the body surrounding the portion of said path which is inside the body, whether said portion is composed of laminations or in part of the body, constitutes a conductor for the heating current; and that in the broader aspect of the invention the means (such as D, D' or D") constituting a by-pass for the flux may be formed in any way so long as it interlinks either with said conductor or with the exciting conductor. Thus, as shown by way of example in Figs. 3 and 4, the by-pass means may be wholly distinct from the main paramagnetic path.

An advantageous feature of the particular embodiments of the invention herein illustrated consists in that the exciting coil is mounted within the handle of the iron, whereby the coil is not only protected from the heated body but is wholly incorporated within the usual compass of flat-irons.

I claim:

1. An electric heating device comprising a body portion heatable by variable magnetic flux induced therein, a paramagnetic loop extending outside said body and joining the body at spaced points, an exciting coil on said loop outside said body, and a paramagnetic shunt across said loop between said body and coil to restrain the current in said coil to a safe value.

2. An electric flat-iron comprising a body portion heatable by variable magnetic flux induced therein, a handle above said body, a magnetic core extending from said body through said handle and thence back to said body, an exciting coil on said core outside said body, and a paramagnetic shunt across said loop between said body and coil to restrain the current in said coil to a safe value.

3. In a device of the character described, the combination of means constituting a substantially closed paramagnetic path, a conductor interlinking with said path for generating variable flux therein, a separate conductor interlinking with said path to form a circuit for current induced by said variable flux, and means constituting a paramagnetic by-pass through which flux flows in interlinking relationship with one of said conductors, said by-pass being free from conducting material on one side so that current is not induced therearound, whereby the flux flowing through said by-pass restrains the current in said first conductor.

4. A heating device comprising means constituting a substantially closed paramagnetic path, a conductor interlinking with said path for generating variable flux therein, a separate conductor interlinking with said path to form a circuit for current induced by said variable flux, and means constituting a paramagnetic by-pass through which flux flows in interlinking relationship with one of said conductors, said last conductor comprising a portion of the heated body of the device and said by-pass having a portion disposed outside said body so that current is not induced therearound.

Signed by me at Boston, Massachusetts, this 4th day of May, 1923.

NELSON O. CLARK.